US008225085B2

(12) United States Patent
Karandikar (10) Patent No.: US 8,225,085 B2
(45) Date of Patent: Jul. 17, 2012

(54) SYSTEM AND METHOD FOR DISTRIBUTED SSL PROCESSING BETWEEN CO-OPERATING NODES

(75) Inventor: Shrikrishna Karandikar, Fremont, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1100 days.

(21) Appl. No.: 11/758,487

(22) Filed: Jun. 5, 2007

(65) Prior Publication Data

US 2008/0307219 A1     Dec. 11, 2008

(51) Int. Cl.
H04L 29/06  (2006.01)
G06F 15/16  (2006.01)
H04N 1/44   (2006.01)
H04K 1/00   (2006.01)

(52) U.S. Cl. .................... 713/153; 709/231; 709/247
(58) Field of Classification Search .................... None
See application file for complete search history.

(56) References Cited

U.S. PATENT DOCUMENTS

| 7,370,351 | B1 * | 5/2008 | Ramachandran et al. ........ 726/8 |
| 7,543,146 | B1 | 6/2009 | Karandikar |
| 7,584,505 | B2 * | 9/2009 | Mondri et al. ................... 726/13 |
| 2002/0016911 | A1 * | 2/2002 | Chawla et al. ................... 713/153 |
| 2003/0014628 | A1 * | 1/2003 | Freed et al. ..................... 713/155 |
| 2004/0243703 | A1 * | 12/2004 | Demmer et al. ............... 709/224 |
| 2007/0038853 | A1 * | 2/2007 | Day et al. ....................... 713/153 |
| 2009/0013399 | A1 * | 1/2009 | Cottrell et al. .................. 726/12 |

\* cited by examiner

Primary Examiner — Matthew Henning
(74) Attorney, Agent, or Firm — Tarek N. Fahmi, APC (57) ABSTRACT

A secure communication protocol (e.g., SSL) transaction request from a client to a server is intercepted at a client-side proxy communicatively coupled to the client and logically deployed between the client and the server. The client-side proxy initiates a secure connection with the server and passes an attribute (e.g., a cryptographic key) associated with that secure connection to a server-side proxy communicatively coupled to the server and logically deployed between the client and the server. This enables the server-side proxy to engage in secure communications with the server in a transparent fashion.

15 Claims, 7 Drawing Sheets

SYSTEM AND METHOD FOR DISTRIBUTED SSL PROCESSING BETWEEN CO-OPERATING NODES

FIELD OF THE INVENTION

The present invention relates to methods and systems for distributed secure socket layer (SSL) processing between two (or, potentially, more) cooperating nodes communicatively coupled to one another (e.g., via one or more computer networks).

BACKGROUND

The SSL protocol, originally developed by Netscape Communications, has been universally accepted as a means for authenticated and encrypted communication between clients and servers over the Internet. The SSL protocol can be used to secure various application protocols, such as HTTP over SSL (HTTPS), IMAP over SSL (SSL), FTP over SSL (FTPS), etc. One of the goals of SSL is to prevent so-called "man-in-the-middle" attacks. The "man in the middle" can be regarded as a rogue computer that attempts to insert itself in communications between a client and a server. Where secure communications are employed, the rogue attempts to intercept the legitimate cryptographic keys that are passed back and forth during the SSL exchange, substitute its own keys, and make it appear to the client that it is the server, and to the server that it is the client. This is accomplished by the rogue exchanging its own keys with the client and server, allowing the rogue to establish its own session keys for use with the real server and client. Thus, the rogue not only is able to read all the data that flows between the client and the real server, but also to change the data without being detected.

To counter the man-in-the-middle threat, an important part of the SSL authentication process requires that a client check that the domain name in the server's certificate corresponds to the actual domain name of the server with which the client is attempting to communicate (this is in addition to checking the validity of the certificate by performing other steps in the authentication process). This is done using the server's digital certificate, a certification (issued by a trusted third party known as a certificate authority or CA) that a particular cryptographic key, known as the server's "public key" is associated with the server identity specified in the certificate (e.g., the server's web address). That is, the CA validates the association between the owning entity (the server) and the public key.

Once the client and (optionally) the server is/are satisfied that each is the computer it claims to be, the client and server can exchange session keys. These are additional cryptographic keys that are used to encrypt the data transfers between the computers from then on. Thus, the SSL protocol provides for both authentication and encryption, and has built in safeguards to prevent third parties' computers from snooping on communications between a client and a server.

Sometimes, however, such snooping is not malicious. For example, Internet devices known as proxies are often used as "men-in-the-middle" to act as caches, content filters, virus filters, etc. Where SSL is used, however, such proxies are unable to participate in the communication stream (because the SSL protocol itself is designed to ensure they cannot). This presents a problem where there are legitimate reasons for a proxy to intercept SSL communications and it is therefore desirable to have a scheme for overcoming such difficulties.

US PGPUB 2007/0038853 (hereinafter, the "'853 publication") describes one proposal for allowing a proxy to intercept SSL communications. In this scheme, a server-side accelerator intercepts an SSL connection request from a client to a server and establishes a secure connection between itself and the client. Later, the server-side accelerator provides the symmetric keys and cipher information to a client-side accelerator, which allows the client-side accelerator to assume control of the secure connection with the client. Such a solution does not provide a server-side accelerator that is transparent to the server. Instead, the server-side accelerator is explicit insofar as the server is concerned because the server sees SSL packets that were generated at the server-side accelerator.

SUMMARY OF THE INVENTION

In one embodiment, the present invention provides for intercepting a secure communication protocol (e.g., an SSL) transaction request from a client to a server at a client-side proxy communicatively coupled to the client and logically deployed between the client and the server. The client-side proxy then initiates a secure connection with the server. The secure connection is associated with at least one attribute (e.g., a cryptographic key to be used to encrypt data) enabling secure communication of data with the server, and the attribute is forwarded from the client-side proxy to a server-side proxy communicatively coupled to the server and logically deployed between the client and the server. This enables the server-side proxy to engage in secure communications with the server.

The attribute may be forwarded from the client-side proxy to the server-side proxy over a secure communication channel between the two proxies. That communication channel may be a previously-established secure communication channel between the client-side proxy and the server-side proxy. Alternatively, in some cases, prior to forwarding the attribute an additional secure connection between the client-side proxy and the server-side proxy may be initiated.

In various embodiments, data from the client may be intercepted at the client-side proxy and an SSL record including at least a portion of the data assembled. The SSL record may be transferred from the client-side proxy to the server-side proxy, and the attribute used to encrypt the SSL record at the server-side proxy to produce an encrypted SSL record. The encrypted SSL record may then be transferred from the server-side proxy to the server.

In further embodiments, an encrypted SSL record may be received at the server-side proxy from the server and decrypted using the attribute to produce an unencrypted SSL record. The unencrypted SSL record may then be transferred from the server-side proxy to the client-side proxy, for example by transmitting the unencrypted SSL record over a secure inter-proxy communication link. The inter-proxy communication link may be secured prior to forwarding the attribute from the client-side proxy to the server-side proxy. IDS/IPS may be employed on the inter-proxy communication link as desired.

Yet another embodiment of the invention provides for establishing a secure communication channel between a server-side proxy and a server using an attribute associated with the secure communication channel, the attribute having first been passed from the server to a client-side proxy in response to a request to establish secure communications between the client-side proxy and the server. The attribute may be a cryptographic key and/or a cipher. Prior to establishing the secure communication channel, the attribute may be transferred from the client-side proxy to the server-side proxy via a secure inter-proxy communication channel.

Encrypted data received from the server at the server-side proxy may be decrypted using the attribute to produce unencrypted data. The unencrypted data may then be transferred from the server-side proxy to the client-side proxy via the secure inter-proxy communication channel. Such unencrypted data may be optimized prior to such transfer, for example using byte caching at the server-side proxy. Data (e.g., SSL records) received from the client-side proxy at the server-side proxy over the inter-proxy communication channel may be encrypted at the server-side proxy using the attribute to produce encrypted data, and the encrypted data transmitted to the server via the secure communication channel. These SSL records may carry various kinds of application traffic, including but not limited to HTTP, IMAP or POP traffic.

BRIEF DESCRIPTION OF THE DRAWINGS

The present invention is illustrated by way of example, and not limitation, in the figures of the accompanying drawings, in which.

DETAILED DESCRIPTION

Described herein are methods and systems for distributed SSL processing between two (or, potentially, more) cooperating nodes communicatively coupled to one another (e.g., via one or more computer networks). Such methods and systems may enable acceleration (e.g., using dictionary compression or other forms of compressed data communications) and/or monitoring (e.g., using intrusion detection systems, content scans, and the like) of SSL encrypted content over data links between the co-operating nodes.

In U.S. patent application Ser. No. 10/871,650, filed Jun. 18, 2004, assigned to the assignee of the present invention and incorporated herein by reference, the present inventor and others described systems and methods by which proxies could be authorized to monitor secure (e.g., SSL) communication sessions between a client and a server. In this context, monitoring of the secure communication session may include decrypting encrypted packets at the proxy. A single SSL-enabled proxy, however, will not facilitate the use of an application delivery network (ADN).

ADNs have become more an more common among large enterprises where there is a need to deliver business applications to remote users and/or branch offices. ADNs do more than simply making use of conventional Web transactions. Instead, ADNs often embody layers of caching, compression, traffic shaping, quality of service management, and application-specific processes to optimize content delivery between clients and servers. Of course, data security is an important consideration in any ADN. The goal of the ADN is to accelerate delivery of content to the resources where it will be used or consumed.

Thus, ADNs may be regarded as a collection of technologies that, when deployed together, provide application availability, security, and acceleration. Typically in an ADN, a traffic management device (usually a layer 4-7 switch) distributes network traffic among geographically distributed servers according to application-specific criteria. This allows for distribution of the traffic load in an intelligent fashion.

To provide for acceleration within an ADN (or other network), a split proxy configuration may be used. As alluded to above, a proxy is a computer-based device logically located between a client and a server. Proxies can provide a variety of services, including caching of content. A split proxy is essentially a pair of proxies installed across two computer-based systems. Since they are effectively two parts of the same program, they can communicate with each other in a more efficient way than they can communicate with a more standard resource or tool, such as a website or browser. This is ideal for compressing data over a slow link, such as a wireless or mobile data service and also for reducing the issues regarding high latency links (such as satellite links) where establishing a TCP connection is time consuming.

One example of the manner in which individual nodes of a split proxy pair can communicate efficiently with one another is through the use of byte caching. Byte caching (or dictionary compression as it is sometimes called) eliminates the repeated transmission of sequences of bytes sent over TCP connections. Protocol specific handlers, such as SSL (HTTPS), CIFS, MAPI, and HTTP, can be used with byte caching to recognize and eliminate repeat sequences. That is, instead of transmitting the repeated sequences, an indicator or tag can be used instead. So long as the indicator or tag is smaller than the original data sequence, bandwidth is saved by transmitting only the indicator. Such an exchange may take place over a byte cache tunnel between two ends of a split proxy.

Figure 1:
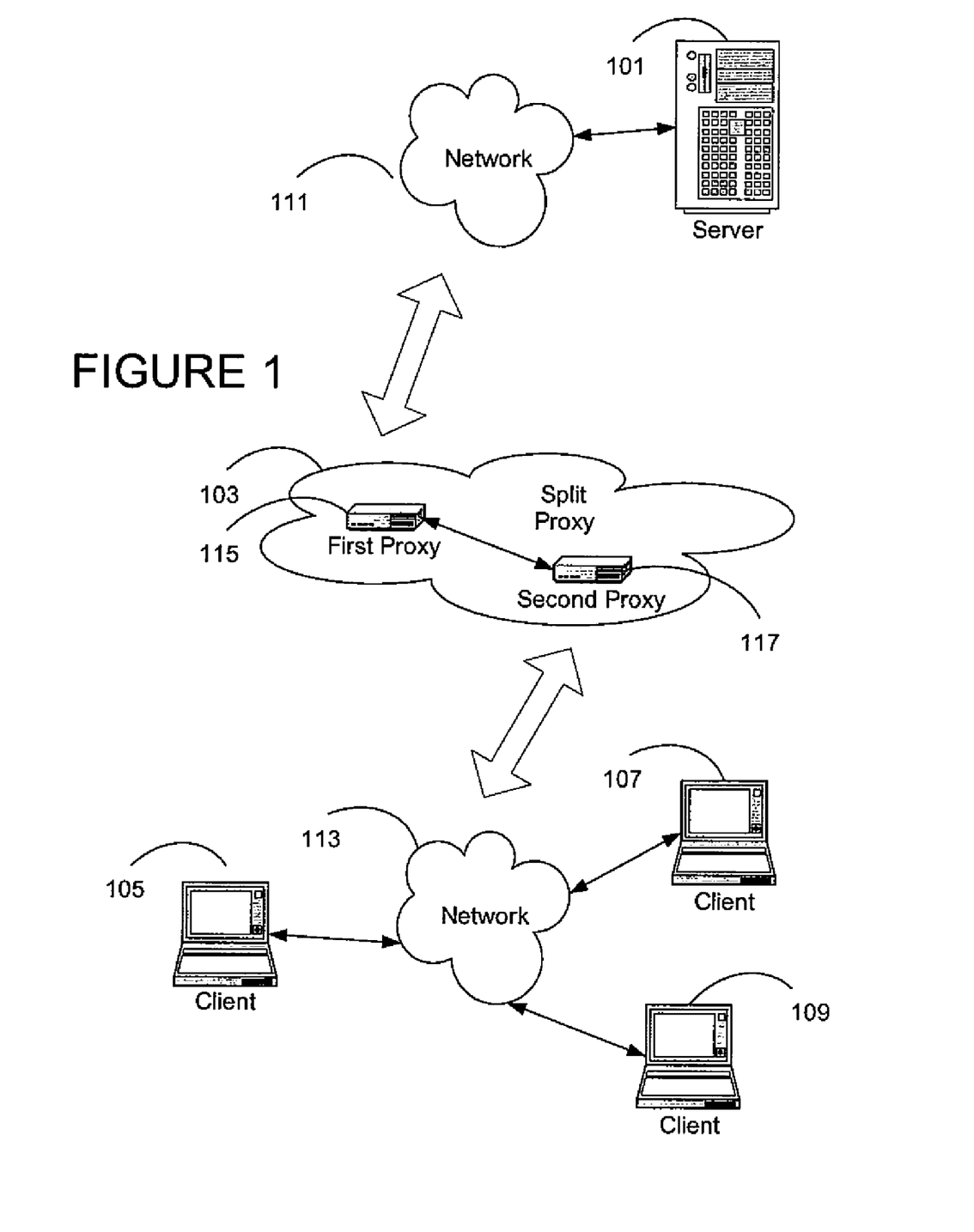
FIG. 1 illustrates a communication system that includes a split proxy device configured for use in accordance with an embodiment of the present invention.

FIG. 1 illustrates a communication system that includes a split proxy device. Split proxy 103 is connected to client computers 105, 107, and 109 via a first network 113, e.g., an intranet, and includes a first proxy 115 and a second proxy 117 located on different computer platforms. Split proxy 103 intercepts communication between client computers 105, 107, and 109, and a second network 111, e.g., the Internet. Thus, if server 101 (which is communicatively coupled to network 111) attempts communication with any of client computers 105, 107, and/or 109, that communication must go through split proxy 103. Likewise, if any of client computers 105, 107, and 109 attempts communication outside of network 113, that communication must also go through split proxy 103. The communication link between the first and second proxies 115 and 117 may be a high latency link and the two proxies may collaborate (e.g., using byte caching) to reduce application latency induced by this link.

Figure 2:
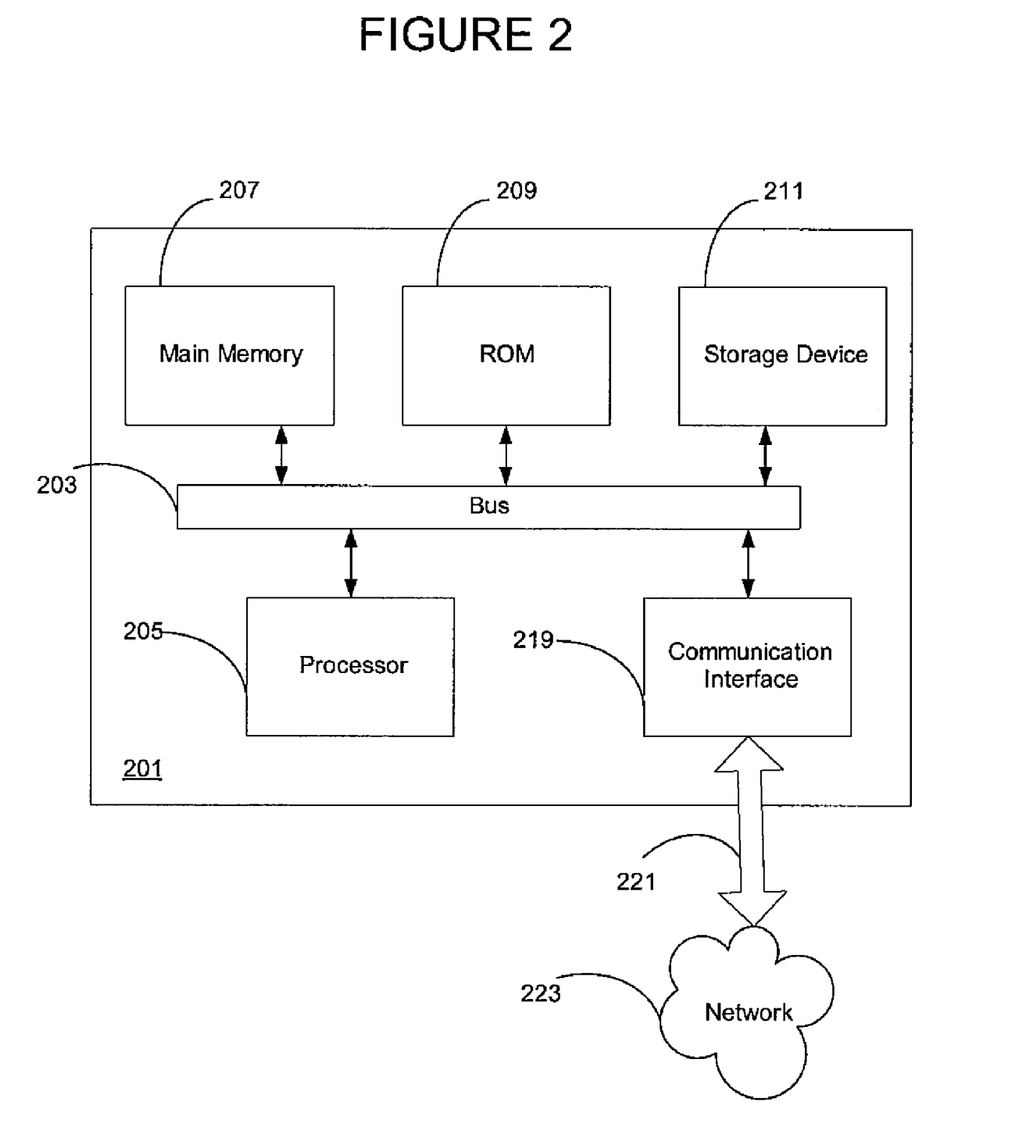
FIG. 2 is a diagram of a computer system that can be configured as a proxy consistent with an embodiment of the present invention.

FIG. 2 is a diagram of a computer system that can be configured as a proxy consistent with an embodiment of the present invention. Computer system 201 includes a bus 203 or other communication mechanism for communicating information, and a processor 205 coupled with bus 203 for processing the information. Computer system 201 also includes a main memory 207, such as a random access memory (RAM) or other dynamic storage device, coupled to bus 203 for storing information and instructions to be executed by processor 205. In addition, main memory 207 may be used for storing temporary variables or other intermediate information during execution of instructions to be executed by processor 205. Computer system 201 further includes a read only memory (ROM) 209 or other static storage device coupled to bus 203 for storing static information and instructions for processor 205. A storage device 211, such as a magnetic disk or optical disk, is provided and coupled to bus 203 for storing information and instructions.

According to one embodiment of the present invention, processor 205 executes one or more sequences of one or more instructions contained in main memory 207. Such instructions may be read into main memory 207 from another computer-readable medium, such as storage device 211. Execution of the sequences of instructions contained in main memory 207 causes processor 205 to perform the process steps described herein. One or more processors in a multi-processing arrangement may also be employed to execute the sequences of instructions contained in main memory 207. In alternative embodiments, hard-wired circuitry may be used in place of or in combination with software instructions. Thus, embodiments are not limited to any specific combination of hardware circuitry and software.

Further, the instructions to support the system interfaces and protocols of system 100 may reside on a computer-readable medium. The term "computer-readable medium" as used herein refers to any medium that participates in providing instructions to processor 205 for execution. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Computer system 201 also includes a communication interface 219 coupled to bus 203. Communication interface 219 provides a two-way data communication coupling to a network link 221 that is connected to a local network 223. For example, communication interface 219 may be a network interface card. As another example, communication interface 219 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 219 sends and receives electrical, electromagnetic or optical signals that carry digital data streams representing various types of information.

In accordance with the present invention, distributed SSL processing is employed across the co-operating nodes of a split proxy, such as split proxy 103 in FIG. 1. For convenience of discussion herein, the separate nodes will be discussed as being instantiated on separate computer systems, however, it should be recognized that the nodes may be instantiated as programs executing on a client and/or a server platform. For example, one of the nodes of the split proxy may be included as part of a client browser application, while the second node is a separate computer system deployed between the client and server. In other cases, one of the nodes of the split proxy may be instantiated as a program executing on the server, while the second node is a stand alone computer system deployed between the server and a client. In still further cases, both nodes of the split proxy may be deployed on separate, stand-alone computer systems deployed between the client and the server. In still other embodiments, one node of the split proxy may be instantiated as a program executing on the client, while the other node is instantiated as a program executing on the server. The exact physical configuration and instantiation of the co-operating nodes is not critical to the present invention.

Split proxy 103 may function as an application aware SSL proxy; that is, a device capable of decrypting SSL records and understanding the native application protocols encapsulated within the SSL records (e.g., HTTPS, IMAPS, POPS, etc.). The use of split proxy 103 makes it possible to apply optimizations, such as byte caching, for SSL encrypted application traffic. Preferably, in order to comply with most implementations of an ADN, proxy 115 acts only as a concentrator for ADN tunnels, while proxy 117 acts as an application aware SSL proxy. In this regard the term concentrator is meant to indicate a device that aggregates (or concentrates) a number of traffic flows from multiple nodes. This configuration is not critical to the present invention, however, and in other embodiments these roles may be reversed.

Figure 3:
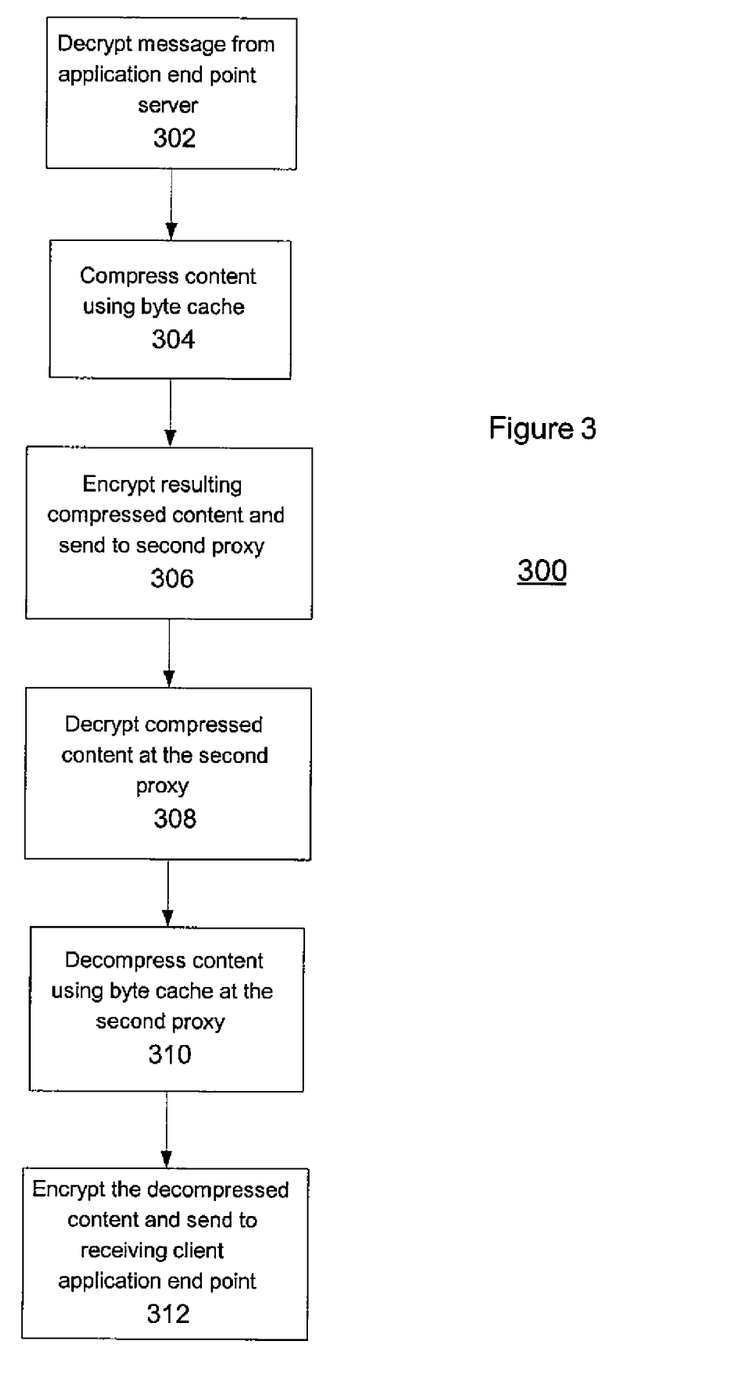
FIG. 3 is a flow diagram showing steps involved in processing incoming content received at a proxy, in accordance with an embodiment of the present invention.

Because SSL encryption randomizes byte sequences within content delivered between proxies 115 and 117, making that content less compressible than if such randomization had not occurred, the present invention provides for byte caching and other compression-based optimizations of application protocol data at the proxies prior to SSL encryption. Hence, the sequence of events 300 for incoming content received at one of the proxies (say, the first proxy in the above example) is as follows (see FIG. 3): Decrypt the message from the application end point or server at the proxy (302); compress the content using the byte cache (304); optionally encrypt the resulting compressed content and send to the second proxy (306); if the compressed content was encrypted, decrypt same at the second proxy (308); decompress the content using the byte cache at the second proxy (310); and encrypt the decompressed content and send same to the receiving client/application end point (312). These steps are explained in greater detail below.

One objective of embodiments of the present invention is to make the server-side proxy (first proxy 115 in FIG. 1) invisible (i.e., transparent) to the server with regard to SSL-layer processing. Hence, end-to-end SSL protocol processing (i.e., including the SSL transaction to establish the session keys used during later communications) will take place between the client-side proxy (second proxy 117 in FIG. 1) and the server. The server-side proxy will operate as a content transformer, performing various cipher operations and byte-cache transformation for content passing between the proxies.

Figure 4A:
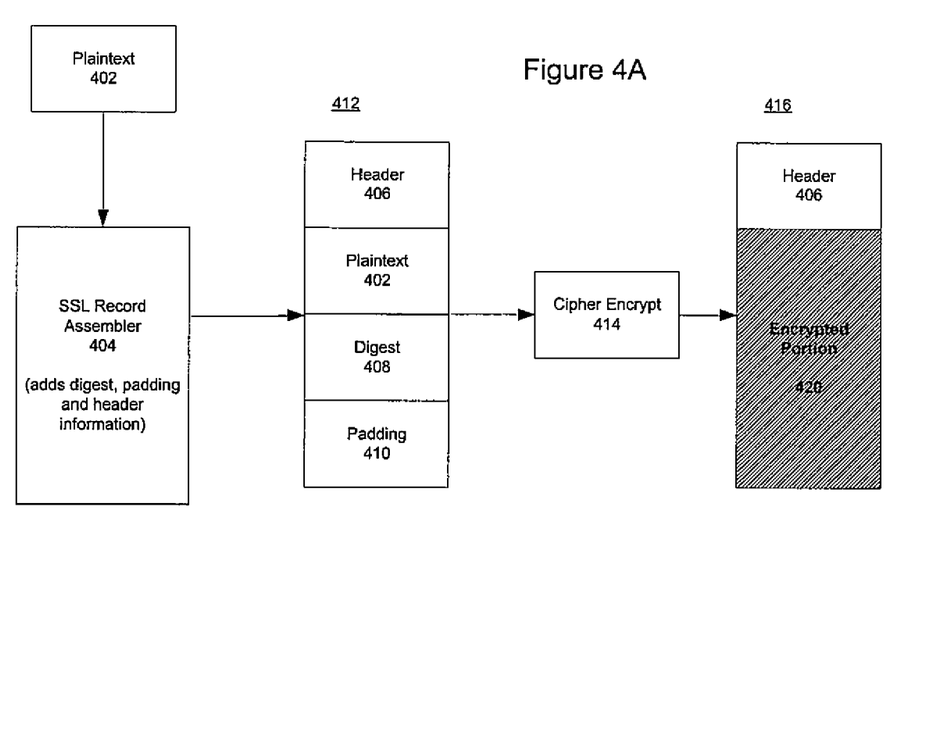
FIGS. 4A and 4B illustrate processes involved in encryption and decryption of messages according to the SSL protocol once session keys have been exchanged between nodes.

As discussed above, the SSL protocol provides for an exchange of session keys between nodes participating in the secure exchange. This key exchange takes place as part of a so-called SSL handshake (which also includes the authentication processes discussed above). The session keys are symmetric cryptographic keys, meaning the two nodes each use the same key to encrypt/decrypt content. Once the keys are exchanged, the SSL protocol provides for secure communication by encrypting each application packet as shown in FIG. 4A.

During encryption, the plaintext packet 402 is provided to an SSL record assembler 404. This is typically a software module, but may also be implemented in hardware. The SSL record assembler is responsible for adding an appropriate header message 406, digest information 408, and padding (e.g., zero padding, if necessary) 410 to the plaintext message 402, to create an SSL record 412. The exact digest information 408 that is concatenated to the plaintext message 402 depends on the digest algorithm in use between the nodes. This aspect of the SSL communication is decided upon by the nodes during the handshake process. The resulting SSL record 412 is subjected to the cipher process 414 to produce an encrypted SSL record 416. This is done using the symmetric key and encryption algorithm that were agreed upon by the nodes during the SSL handshake. The encryption process produces an encrypted portion 420, which is the encrypted version of the plaintext, digest and padding (if any) portions of the original SSL record.

Figure 4B:
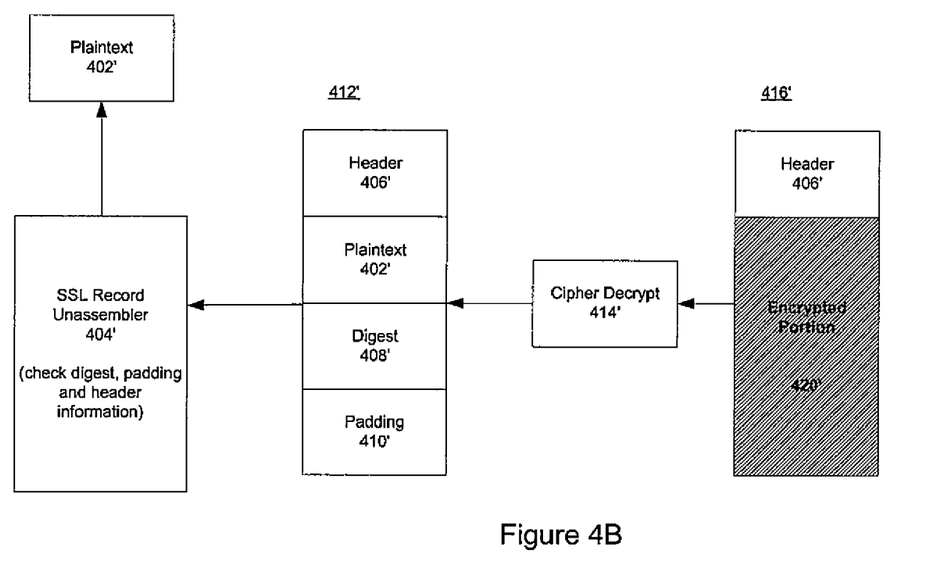

The decryption process is the reverse of the encryption process and is shown in FIG. 4B. An encrypted SSL record 416', which includes an encrypted portion 420' and a header 406', is subject to a decryption cipher 414' to produce a decrypted SSL record 412'. The decryption cipher 414' relies on the symmetric key and SSL decryption algorithm that were agreed upon during the SSL handshake. The decrypted SSL record 412' includes the plaintext message 402', which is extracted from the decrypted SSL record using an SSL unassembler 404'. During this process, the padding 408' is ignored and the digest for the plaintext is computed locally. If the locally computed digest is the same as the digest 408' received as part of the SSL record 412', the plaintext message 402' is passed to its application.

Figure 5:
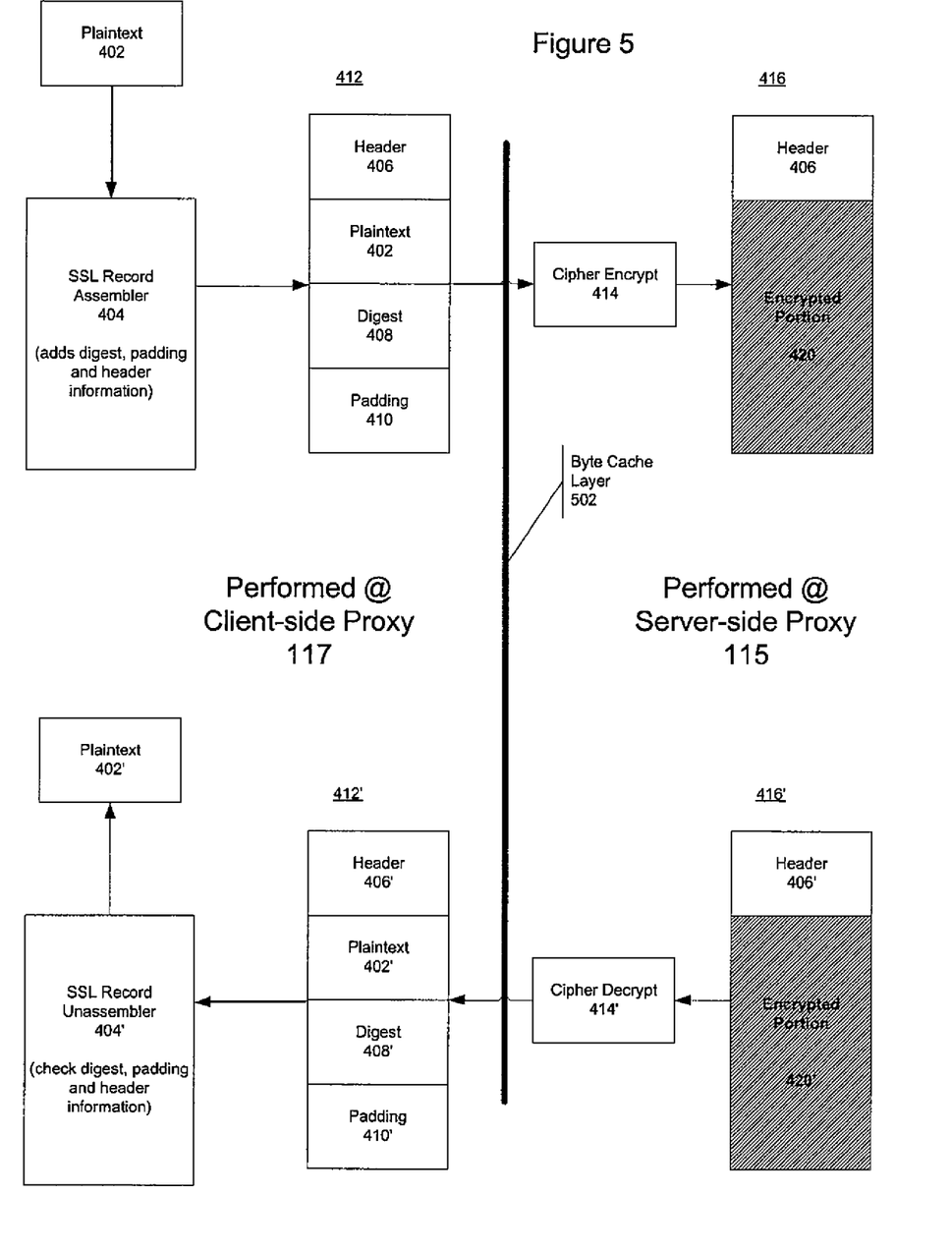
FIG. 5 illustrates the division of encryption and decryption functions between client-side and server-side proxies according to an embodiment of the present invention.

The present invention splits the above-described SSL processing between the co-operating nodes of the split proxy. As illustrated in FIG. 5, portions of the SSL process not involved with cipher encryption/decryption are performed by the client-side (or second) proxy 117. That is, the assembly/disassembly of the SSL record from/to the plaintext message, digest computation and padding operations are performed by the client-side (or second) proxy 117. Portions of the SSL process involving the cipher encryption/decryption are performed by the server-side (or first) proxy 115. The solid vertical line running through these processes represents the local byte cache layer 502 at each of the two proxies. Thus, when the client-side proxy is sending data to the server-side proxy, byte caching optimizations are performed on the SSL record 412, prior to encryption 414. The server-side proxy on receiving this record, removes the byte cache optimizations, encrypts the data section with the key and cipher information obtained earlier from the client-side proxy and sends this encrypted record 416 to the server. When the server-side proxy receives an SSL record 416' from the server, it first decrypts the SSL record using the key and cipher information sent by the client-side proxy, applies byte caching optimizations to the decrypted SSL record 414' and sends it to the client-side proxy. Hence, the client-side proxy generates and receives the unencrypted SSL records 412 and 412', respectively.

In effect, the server-side proxy 115 is acting as a remote cipher engine for SSL records generated at the client-side proxy 117. Therefore, the server-side proxy will need to be configured to parse SSL records (such as record 412) to identify the data section (plaintext+digest+padding) therein and to apply cipher operations thereto.

The client-side proxy 117 will need to provide the symmetric key, initialization vector (needed for block ciphers) and cipher algorithm selection required for the cipher operations, to the server-side proxy 115. The symmetric key and cipher algorithm are negotiated between the client-side proxy and the server during the initial SSL handshake. The client-side proxy 115 will also need to be configured to suppress local encryption/decryption operations on SSL records once the SSL handshake is complete.

One additional consideration is the communication link between the two proxies. Because the proxies will be exchanging the symmetric keys used for SSL communications between the client and the server and will also be passing unencrypted SSL records between themselves, the communication link may need to be secured. This may be done using separate SSL encryption (requiring a separate SSL handshake between the proxies) or another form of encryption. Note, if the communication link between the proxies 115 and 117 is deemed to be secure, no such measures are required. Often, however, this will not be the case as the two nodes of the split proxy 113 will communicate with one another over unsecured networks such as the Internet.

With the above in mind, the overall SSL split proxy solution can be described. In this description, assume that the client-side proxy 117 acts as an application aware SSL proxy while the server-side proxy 115 acts as a remote cipher engine for the client-side proxy. Assume further that the two proxies communicate over a secure communication channel (either because the proxies use a separate SSL or other encrypted communication channel or the data link between the proxies is physically secure and so traffic over that link can be transmitted in the clear).

When an SSL connection is made from a client (say client 109 in FIG. 1) to the client-side (or second) proxy 117, the client-side proxy initiates a suitable SSL connection with the server 101. This SSL connection makes use of server-side (or first) proxy 115, the existence of which may be hard coded in client-side proxy 117 or otherwise discovered through the use of appropriate signaling between the proxies. At this point in the process, the server-side proxy 115 simply operates to tunnel the SSL handshake between the client-side proxy 117 and the server 101. The SSL handshake proceeds in the conventional fashion until the symmetric encryption keys are exchanged (note, this assumes that the client-side proxy 117 will be intercepting SSL traffic—it is possible that not all SSL communications will be intercepted by the client-side proxy, for example where policy decisions based on the identity of the server as discovered from the server's digital certificate indicate that no such interception should be performed).

If the communication channel between the two proxies is not already secure, client-side proxy 117 may now takes steps to secure it. This may be done using a separate SSL handshake between the two proxies, or may be done using a different protocol for secure communications. Once this communication channel has been secured, the client-side proxy passes a special SSL record to the server-side proxy that contains the symmetric encryption key and cipher information that was agreed upon between the client-side proxy 117 and the server 101. This SSL record is protected using the security arrangements agreed upon between the two proxies 115 and 117 when an independent secure channel was established among them, as indicated above.

Thereafter, communications between the two proxies 115 and 117 are subjected to byte caching, and/or gzip compression (and whatever security protocols are in effect for the communication channel between the proxies), but are not encrypted using the SSL keys or ciphers agreed upon between the client-side proxy 117 and the server 101. Stated differently, once the client-side proxy 117 has provided the symmetric key, optional initialization vector (IV) and choice of cipher for exchanges with server 101 to the server-side proxy 115, the client-side proxy 117 no longer encrypts SSL records using that key or cipher. Because the SSL records (which do make use of the SSL digest algorithm agreed upon between the client-side proxy 117 and the server 101) are not encrypted, they can be compressed using the byte cache layer. The resulting compressed information is subject to the security protocol in effect for the communication channel between the two proxies.

When the compressed information is received at the server-side (or first) proxy 115, the communication channel security protections are removed (e.g., the packets are decrypted), the byte caching and other optimizations are stripped, and the resulting SSL records are encrypted using the symmetric key, IV and cipher information appropriate to communications with server 101. Thus, to the server it appears as though the resulting encrypted SSL record was generated by the client-side proxy 117. The server-side proxy 115 is transparent or invisible to the server 101 in this regard.

In response to a communication from the client 109, server 101 will transmit encrypted SSL records to server-side proxy 115. Using the symmetric key, IV and cipher application information provided by the client-side proxy, the server-side proxy 115 decrypts these SSL records and subjects them to compression at the byte cache layer. Because the records are not encrypted, such compression is made possible. The resulting compressed information is protected as appropriate for the inter-proxy communication channel (e.g., which may involve SSL encryption using a different key/algorithm) and passed to the client-side proxy 117.

When the client-side proxy 117 receives the information from the server-side proxy, the client-side proxy removes the communication channel security protection (if any) and uncompresses the result to recover the unencrypted SSL record. No further decryption is required, however, the client-side proxy 117 completes the SSL processing by performing the digest checks, etc., before passing the plaintext to the local application layer. This plaintext may be subject to further processing before being passed to the client 109. for example, the communication link between the proxy 117 and the client 109 may itself be an SSL communication link.

The above-described process provides certain advantages. For example, correctness issues due to handshake errors are avoided because the SSL symmetric keys and algorithm information are exchanged between the proxies after the handshake between the client-side proxy and the server has been completed. The server-side proxy does not participate in the handshake process (other than as a tunnel for the client-side proxy communications). In addition, digest mismatch errors during transfer of application data are avoided because digest computation is done only at the client-side proxy. As long as the communication channel between the two proxies is secured, e.g., by SSL, IPSEC or other appropriate means, the exchange of symmetric keys from the client-side proxy to the server-side proxy does not compromise the end-to-end SSL protocol Such secure tunnels used for securing the communication link between the two proxies may be established in advance of any client-to-server communication.

The SSL protocol also supports renegotiation of a fresh symmetric key on existing SSL sessions. This renegotiation can be initiated by either the server or the client. The present invention supports such renegotiation as well. When such renegotiation occurs, the client-side proxy will send a fresh set of key and cipher information to the server-side proxy.

In some cases, the client-side proxy may need to present a client certificate to the server. The present invention accommodates such scenarios because key and cipher information is exchanged between the client and the server-side proxy only after the SSL handshake between the client-side proxy and the server is complete. Thus, all handshake-supported variations that include client certificate-based authentications are supported.

Note that the above-described solution can be used even where no acceleration at the byte cache layer is to be used. The SSL traffic may simply be tunneled between the client-side and server-side proxies, without any byte cache compression being employed. This may be done based on policy reasons communicated from the client-side proxy to the server-side proxy.

In another embodiment, the proposed solution can be configured to not use any security or other optimization measures on the communication link between the two proxies. In such cases, unencrypted SSL records (i.e., in-the-clear application content) will be passed on this link, allowing additional applications such as intrusion detection/intrusion prevention (IDS/IPS) scanning to be employed. Such an embodiment illustrates how the present invention may be used in connection with detecting and/or preventing application level threats that can be hidden inside SSL encrypted packets.

In another embodiment, the serve-side proxy could be a chain of proxies, where each proxy in the chain is functioning as a remote cipher engine, such that all the proxies except the proxy closest to the client (i.e., the client-side proxy) are invisible to the server from an SSL perspective. This can be achieved by having the same key and cipher information transmitted to all of the server-side proxies in the chain from the client-side proxy. Note that in any or all of the above-described cases, the application protocol encapsulated in the SSL records can be any protocol, including but not limited to HTTP, IMAP, POP, MSRPC, etc.

Figure 6:
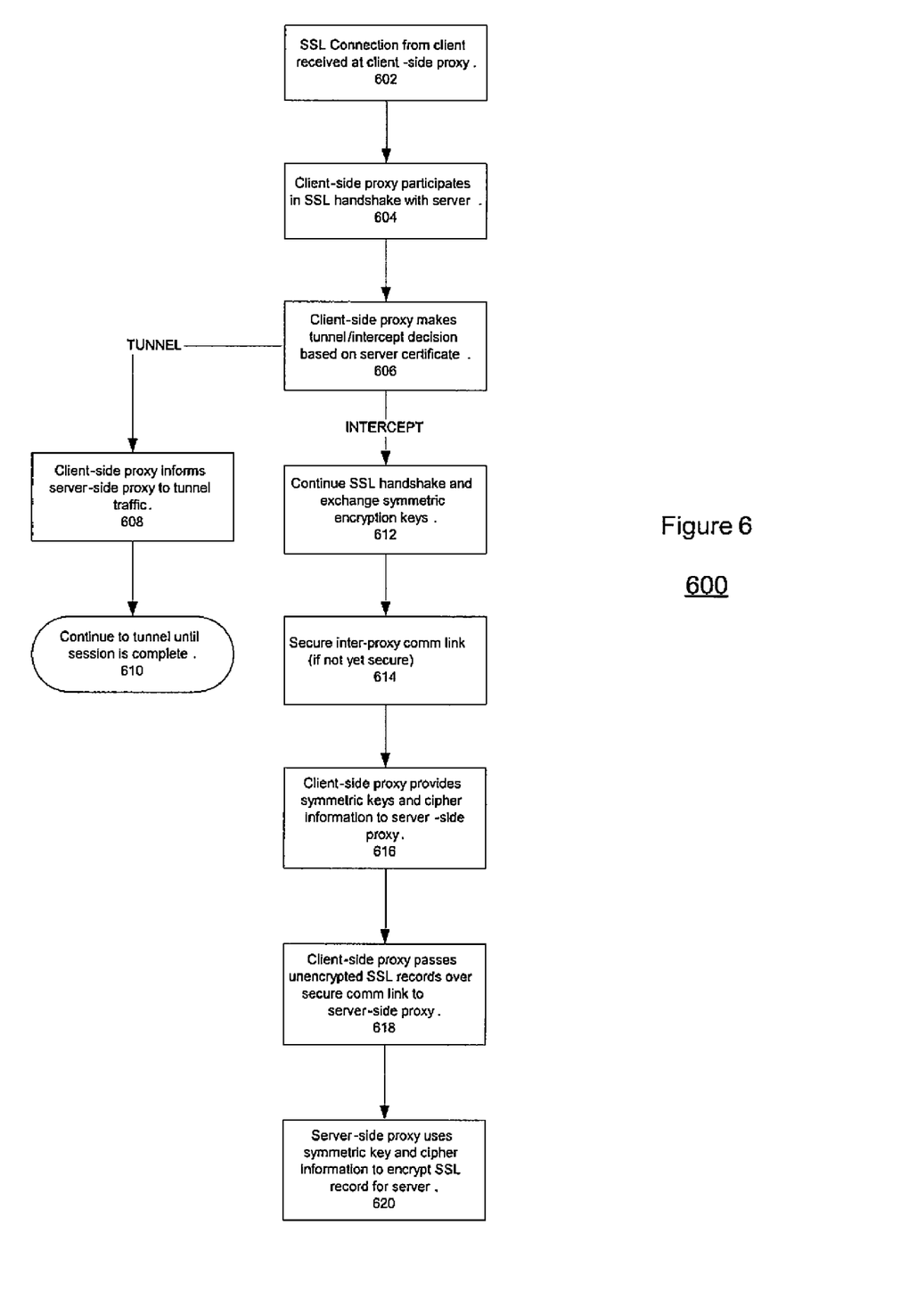
FIG. 6 is a flow diagram illustrating inter-node communications in an SSL split proxy solution configured according to an embodiment of the present invention.

FIG. 6 is a flow chart summarizing portions of the processes discussed above. In brief, process 600 begins with an SSL connection from a client being received at a client-side proxy (602). The client-side proxy participates in an SSL handshake with the server (604), and makes tunnel/intercept decision based on the server's identity as revealed by its digital certificate or other information related to the client or the server (606). In the case of a decision to tunnel the traffic without decryption or acceleration, the client-side proxy so informs the server-side proxy (608), and the two cooperate to tunnel the SSL traffic until the session is complete (610).

However, in the case of an intercept decision, the client-side proxy and the server continue the SSL handshake and exchange symmetric encryption keys and cipher information (612). At this point, the client-side proxy and the server-side proxy secure the communication channel between them (if it is not yet secure) (614) and the client-side proxy subsequently provides the symmetric keys and cipher information to the server-side proxy (616). Now, the client-side proxy passes unencrypted SSL records over the secure channel to server-side proxy (618), which uses the symmetric key and cipher information to encrypt the SSL records for communication to the server (620).

Figure 7:
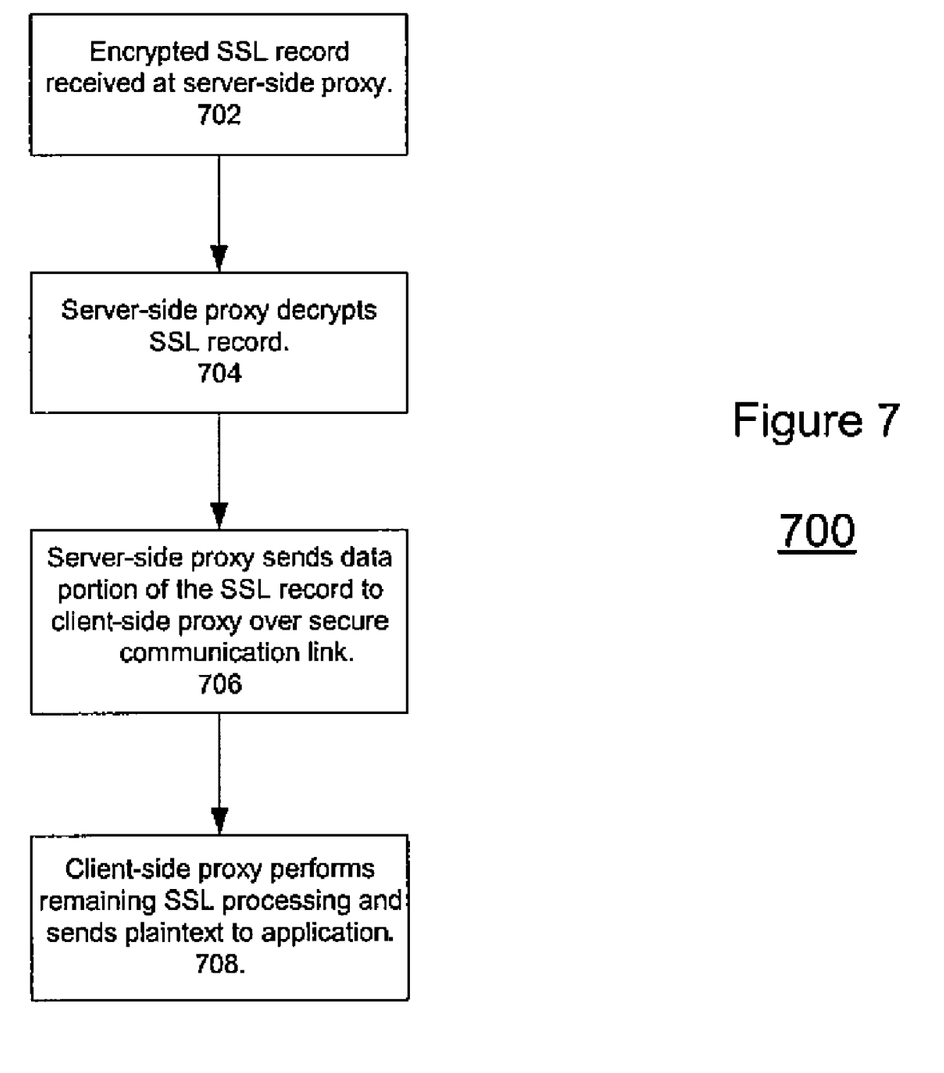
FIG. 7 is a flow diagram illustrating further inter-node communications in an SSL split proxy solution configured according to an embodiment of the present invention.

FIG. 7 illustrates a process 700 which summaries other steps in the processes described above. In brief, when an encrypted SSL record from the server is received at server-side proxy (702), the server-side proxy decrypts the SSL record (704) using the symmetric key and cipher information it received from the client-side proxy. The server-side proxy then sends the data portion of the unencrypted SSL record to client-side proxy over the secure communication channel (706). Because the record is not encrypted, byte cache compression and other optimizations can be applied. Upon receipt of the unencrypted SSL record from the byte cache layer, the client-side proxy performs the remaining SSL processing, checking the digest against a locally computed digest, etc., and sends the plaintext to application (708). From there, the plaintext may be passed on to the client.

As indicated above, The client-side proxy may not know a priori that there is a server-side proxy. Depending on the destination, the server-side proxy may or may not exist. In order to detect the existence of the server-side proxy, the client-side proxy may employ any of a variety of techniques, including but not limited to the use of one or more special packets (e.g., coded with specific source and/or destination IP addresses, flagged in a header and/or option field, etc.; packets encapsulated within other packets; packets directed to specific ports; etc.), to advertise its existence. The server-side proxy (if one exists), will detect the special packet(s) and act on it(them) appropriately to likewise inform the client-side proxy of its existence. The server-side proxy may also save the source and destination MAC addresses of the special packet(s) and direct subsequent packets destined for the client-side proxy to the source MAC address and packets destined for the server to the destination MAC address. Once the two proxies learn of the existence of one another, the optimization/acceleration procedures discussed above can be employed.

As the term is used herein, a software application or module is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. A table, as referred to herein, can be any data structure.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network.

Thus, techniques for distributed SSL processing between two (or, potentially, more) cooperating nodes communicatively coupled to one another (e.g., via one or more computer networks). For example, multiple layers of split proxies may operate within one another in the manner discussed above. Such methods and systems may enable acceleration (e.g., using dictionary compression or other forms of compressed data communications) and/or monitoring (e.g., using intrusion detection systems, content scans, and the like) of SSL encrypted content over data links between the co-operating nodes.

The present solution also differs from that described in the '853 publication cited above. In the '853 publication, a server-side accelerator intercepts an SSL connection request from a client to a server and establishes a secure connection between itself and the client. Later, the server-side accelerator provides the symmetric keys and cipher information to a client-side accelerator, which allows the client-side accelerator to assume control of the secure connection with the client. Such a solution does not provide a server-side accelerator that is transparent to the server. Instead, the server-side accelerator is explicit insofar as the server is concerned because the server sees SSL packets that were generated at the server-side accelerator. In contrast, with the solution proposed herein, the server sees SSL records that were originated at the client-side proxy. These records were encrypted using the key and cipher information negotiated between the client-side proxy and the server. This is made possible because the symmetric key and cipher information travels in the opposite direction (client-side proxy to server-side proxy) as compared to the scheme described in the '853 publication.

Moreover, in embodiments configured in accordance with the present invention, it is the client-side proxy that participates in the SSL handshake with both the client and the server. The client-side proxy later collaborates with the server-side proxy to break up or distribute the SSL processing tasks across the two proxies. This functioning permits the server-side proxy to be transparent to the server from an SSL layer perspective. In contrast, the scheme described in the '853 publication has the server-side proxy participating in the SSL handshake with the client and the server; hence, the server-side proxy cannot be transparent to the server.

Although the present invention has been described with reference to several illustrated embodiments, the invention is not intended to be limited thereby. For example, the term SSL as used herein is meant to indicate all current (SSL 2.0, SSL 3.0, TLS 1.0 and TLS 1.1.) and future versions of the SSL protocol. Moreover, the present invention is applicable to any secure communication protocol in which keys, cipher information or other attributes are passed between network nodes in order to permit the establishment of a secure communication channel. Such communication protocols may generally be characterized by a negotiation phase, where the keys and/or ciphers are agreed upon; and a subsequent data transfer phase, during which the encryption/decryption operations take place using the keys/ciphers exchanged during the negotiation phase. The present invention permits the key/cipher (or other attribute) information to be negotiated by the client-side proxy, then passed from the client-side proxy to the server-side proxy. Thus, the present invention should be measured only in terms of the claims, which follow.

What is claimed is:

1. A method, comprising:
    intercepting a secure communication protocol transaction request from a client to a server at a client-side proxy logically deployed between the client and the server and communicatively coupled to the client, the server communicatively coupled to a server-side proxy logically deployed between the client and the server;
    initiating, from the client-side proxy, a secure connection with the server, wherein the initiating of the secure connection with the server includes the client-side proxy participating in a handshake with the server and the server-side proxy only tunneling the handshake between the client-side proxy and the server, and wherein the secure connection is associated with at least one attribute enabling secure communication of data with the server;
    thereafter forwarding the at least one attribute from the client-side proxy to the server-side proxy, enabling the server-side proxy to engage in secure communications with the server;
    receiving, at the server-side proxy, an encrypted secure socket layer (SSL) record from the server and decrypting the encrypted SSL record using the at least one attribute to produce an unencrypted SSL record; and
    transferring the unencrypted SSL record from the server-side proxy to the client-side proxy, wherein the unencrypted SSL record remains unencrypted during the transferring.

2. The method of claim 1, wherein the secure communication protocol transaction request comprises a secure socket layer (SSL) transaction request.

3. The method of claim 1, wherein the at least one attribute is forwarded from the client-side proxy to the server-side proxy over a secure communication channel between the client-side proxy to the server-side proxy.

4. The method of claim 1, wherein the at least one attribute is forwarded from the client-side proxy to the server-side proxy over a secure communication channel between the client-side proxy and the server-side proxy, and the secure communication channel is established prior to the forwarding.

5. The method of claim 1, further comprising:
    prior to forwarding the at least one attribute, initiating an additional secure connection between the client-side proxy and the server-side proxy.

6. The method of claim 1, wherein the at least one attribute includes one or more of: a cryptographic key, cipher algorithm and initialization vector to be used to encrypt data for the secure communications between the server-side proxy and the server.

7. The method of claim 1, further comprising:
    intercepting data from the client at the client-side proxy and assembling a secure socket layer (SSL) record including at least a portion of the data.

8. The method of claim 7, further comprising:
    transferring the SSL record from the client-side proxy to the server-side proxy.

9. The method of claim 8, further comprising:
    using the at least one attribute to encrypt the SSL record at the server-side proxy to produce an encrypted SSL record and transmitting the encrypted SSL record from the server-side proxy to the server.

10. The method of claim 1, wherein transferring the unencrypted SSL record from the server-side proxy to the client-side proxy comprises transmitting the unencrypted SSL record over a secure inter-proxy communication link.

11. The method of claim 10, further comprising:
    securing the inter-proxy communication link prior to forwarding the at least one attribute.

12. The method of claim 10, wherein transmitting the unencrypted SSL record over the secure inter-proxy communication link comprises optimizing the unencrypted SSL record for said transmittal via the secure inter-proxy communication link.

13. The method of claim 12, wherein optimizing the unencrypted SSL record comprises subjecting the unencrypted SSL record to byte caching at the server-side proxy.

14. The method of claim 1, further comprising:
    scanning the unencrypted SSL records transferred between the server-side proxy and the client-side proxy with at least one of: an intrusion detection, intrusion prevention system, and other application-level content scan.

15. A method, comprising:
    intercepting a secure communication protocol transaction request from a client to a server at a client-side proxy logically deployed between the client and the server and communicatively coupled to the client, the server communicatively coupled to multiple server-side proxies arranged in a chain and each logically deployed between the client and the server;
    initiating, from the client-side proxy, a secure connection with the server, wherein the initiating of the secure connection with the server includes the client-side proxy participating in a handshake with the server and the server-side proxies only tunneling the handshake between the client-side proxy and the server, and wherein the secure connection is associated with at least one attribute enabling secure communication of data with the server;
    thereafter forwarding the at least one attribute from the client-side proxy to the server-side proxies, enabling secure communications between the server-side proxies and the server;
    receiving, at the server-side proxies, an encrypted secure socket layer (SSL) record from the server and decrypting the encrypted SSL record using the at least one attribute to produce an unencrypted SSL record; and
    transferring the unencrypted SSL record from the server-side proxies to the client-side proxy, wherein the unencrypted SSL record remains unencrypted during the transferring.

* * * * *